United States Patent
Wrage et al.

(10) Patent No.: US 7,672,761 B2
(45) Date of Patent: Mar. 2, 2010

(54) WATERCRAFT COMPRISING A FREE-FLYING KITE-TYPE WIND-ATTACKED ELEMENT AS A WIND-POWERED DRIVE UNIT

(75) Inventors: Stephan Wrage, Hamburg (DE); Stefan Müller, Neufahrn (DE)

(73) Assignee: Skysails GmbH & Co. KG, Hamburg (DE)

( * ) Notice: Subject to any disclaimer, the term of this patent is extended or adjusted under 35 U.S.C. 154(b) by 594 days.

(21) Appl. No.: 11/578,825

(22) PCT Filed: Apr. 19, 2005

(86) PCT No.: PCT/EP2005/004185

§ 371 (c)(1),
(2), (4) Date: Oct. 19, 2006

(87) PCT Pub. No.: WO2005/100149

PCT Pub. Date: Oct. 27, 2005

(65) Prior Publication Data

US 2007/0250226 A1     Oct. 25, 2007

(30) Foreign Application Priority Data

Apr. 19, 2004   (DE) .................. 10 2004 018 837

(51) Int. Cl.
*B63H 9/04* (2006.01)
*G06F 19/00* (2006.01)
(52) U.S. Cl. .............. 701/21; 701/207; 701/215; 114/102.18; 244/153 R
(58) Field of Classification Search ............. 701/21, 701/207, 213, 215; 114/111, 365, 102.1, 114/102.18, 343; 244/153 R, 145
See application file for complete search history.

(56) References Cited

U.S. PATENT DOCUMENTS

| 2,433,344 | A | 12/1947 | Crosby |
| 3,180,090 | A | 4/1965 | Hawley et al. |
| 4,102,291 | A | 7/1978 | Sebald |
| 4,497,272 | A | 2/1985 | Veazey |
| 5,271,351 | A | 12/1993 | Horiuchi et al. |

(Continued)

FOREIGN PATENT DOCUMENTS

DE    3817 073 A1    12/1988

(Continued)

OTHER PUBLICATIONS

J.F. Wellicome et al, "Ship Propulsive Kites- An Initial Study," University of Southampton, ISSN 01403818 SSSU 19, pp i-71.

*Primary Examiner*—Tan Q Nguyen
(74) *Attorney, Agent, or Firm*—Alix, Yale & Ristas, LLP (57) ABSTRACT

Disclosed is a wind-powered watercraft in which a free-flying kite-type wind-attacked element that is provided with a profiled wing and is used as the exclusive, an auxiliary, or an emergency drive unit is connected to the vessel only via one traction rope, said traction rope optionally fanning out into a number of holding ropes. The wind-attacked element can be modified via at least one active drive element that is disposed thereupon and is effectively connected thereto by modifying the aerodynamic effect thereof in order to be guided into a given position relative to the watercraft or to dynamically maneuver.

25 Claims, 7 Drawing Sheets

U.S. PATENT DOCUMENTS

| | | |
|---|---|---|
| 5,642,683 A | 7/1997 | Bedford |
| 6,254,034 B1 | 7/2001 | Carpenter |
| 6,616,402 B2 | 9/2003 | Selsam |
| 6,918,346 B2 | 7/2005 | Grenier |
| 7,287,481 B1 * | 10/2007 | Wrage et al. ............ 114/102.29 |
| 2002/0139603 A1 | 10/2002 | Aiken et al. |
| 2002/0185570 A1 * | 12/2002 | Winner ................... 244/155 A |

FOREIGN PATENT DOCUMENTS

| | | |
|---|---|---|
| FR | 2 781 195 A | 1/2000 |
| GB | 2 098 946 | 12/1982 |
| GB | 2 098 950 A | 12/1982 |
| GB | 2 098 952 | 12/1982 |
| GB | 2 294 666 A | 5/1996 |
| WO | WO02/079030 | 10/2002 |
| WO | WO03/097448 | 11/2003 |

* cited by examiner

WATERCRAFT COMPRISING A FREE-FLYING KITE-TYPE WIND-ATTACKED ELEMENT AS A WIND-POWERED DRIVE UNIT

BACKGROUND OF THE INVENTION

The invention relates to a watercraft which is propelled by the wind, in which a freely flying kite-like element on which wind acts and with a wing profile is connected to the vessel body only via a hawser.

A watercraft such as this is known from WO/097448. This vessel has the disadvantage that the aerodynamic shape of the element on which wind acts can be varied exclusively by means of additional control lines, which are routed to the hull of the vessel. This results in the difficulty that, when the element on which wind acts is flying at high altitudes, the additional lines represent a considerable mass because of the long length that they have to have, so that the propulsion performance is decreased, because this mass must additionally be supported by the wind propulsion element, and the corresponding force therefore cannot be converted to forward propulsion. Furthermore, a plurality of pulling lines can become entangled (fouled or twisted).

SUMMARY OF THE DISCLOSURE

A watercraft of the generic type mentioned initially does not have the stated disadvantage allowing the shape of the wing profile to be varied without being operated by long pulling lines.

Variation of the aerodynamic shape of the element on which wind acts allows this to be routed optimally with different wind directions and wind strengths, in which case the control actions should originate from one unit which is located quite close to or in the element on which wind acts, so that the number of active connections, such as lines and the like, is minimal. This is not intended to preclude the main hawser being composed of a plurality of individual lines. However, joint guidance via appropriate guide elements and joint attachment to a force introduction point to the element on which wind acts are important, in which case branching can also originate from this "force node point".

The element on which wind acts may in this case optionally be guided to fixed positions or else to the "maneuvering", that is to say the element on which wind acts carries out specific flight figures in predetermined positions.

One particularly advantageous feature is the fact that the forces for variation of the element on which wind acts need be transmitted only over short distances, so that precise settings are possible, not least because precise transmission of the control commands is not possible when long pulling lines are used for operation, just by virtue of the strains. Furthermore, the element on which wind acts is in consequence not subject to the risk of the lines becoming entangled with one another, and of becoming unmaneuverable. Specifically, it must be remembered that correct adjustment and guidance of the element on which wind acts is also of considerable importance for the watercraft overall since, for example, a maneuver to change the direction of travel must always include readjustment of the element on which wind acts. If, for example, lines were to become crossed over or entangled in this case, then it would either not be possible to carry out the direction change, or the element on which wind acts would have to be cut off.

It is also advantageous for the operating elements and the means for force production to be provided in the immediate vicinity of the element on which wind acts, or even within it, and the corresponding control devices can also be provided at least partially directly at the element on which wind acts or even in it, so that it is also possible to largely dispense with complex signal transmission paths, which are susceptible to disturbances.

All of the aerodynamic controls, such as flaps, control surfaces, as well as the change in its alignment, the attitude and/or shape are included in the variation of the aerodynamic effect of the element on which wind acts.

In this case, the shape can preferably be varied by symmetrical or asymmetrical variation of the wing profile by influencing the alignment of its flow-separation edge, by twisting of the wing profile, by symmetrical and/or by asymmetric variation of the curvature of the wing profile and/or by variation of the point of attachment of the hawser. In other advantageous developments, the aerodynamic characteristics can also be varied by variation of the geometry of the wing profile, as is manifested in the cross section of the kite or of its curvature. A shape variation such as this in the case of a two-layer wing profile advantageously comprises variation of the distance between the two layers by means of appropriate elements.

For weight reasons, it may be advantageous to use a single drive element for operation on both sides and/or in opposite senses for variation of the wing profile in the same sense or asymmetrically. In this case, by way of example, two ailerons are each operated in opposite senses, with the neutral position forming the mid-position of the two control surfaces.

In the case of an element on which wind acts which is composed of textile material, for example as represented by a kite in the form of a paraglider, the aerodynamic effect is preferably varied by adjustment or by lengthening or shortening of at least one control line by means of the drive element.

In order to match the forces to be applied for aerodynamic adjustments, it may be advantageous for at least one control line to have at least one bend or feedback area in the form of a pulley block, in which case the pulley block can be used both to step-up the ratio or to reduce it.

If the control lines form a matrix-like arrangement, this makes it easier to influence a kite in the manner of a paraglider. In this case, this arrangement relates to an area underneath the kite, from which the aerodynamic operations can be carried out jointly. In this case, it is advantageous for different control lines each to be driven in a combined form via a jointly driven operating element, since this reduces the number of drive elements. The jointly driven operating element may in this case, by way of example, comprise an element that is mounted such that it can rotate, a rocker, a lever, a toothed-belt pulley disk or the like, which is moved jointly via a drive motor. The individual control lines then lead to differently selected attachment points on the common operating element, so that respective linear movement results from the geometry of the attachment point, with the relevant control line being moved by this linear movement. In this case, the individual control lines may also be stepped up or reduced by means of pulley blocks or the like. This then results in the movement of the operating element being converted to the desired geometry change of the overall element on which wind acts, or on parts of it.

In another advantageous embodiment, the drive element comprises an electric winch and/or a linear actuator, with the linear actuator being formed by a pneumatic element which expands in the lateral direction when increased pressure is applied, thus shortening its length, or vice versa. Elements such as these are known as "artificial muscles", and are preferably driven pneumatically.

In order to obtain power for the control operations on the element on which wind acts, it is advantageous for a wind turbine to be provided in a container which is provided in the vicinity of the element on which wind acts and is clad in a streamlined manner, and which acts as an electrical generator, which then charges an electrical energy store. If pneumatic elements are used as actuators, it is also possible to provide a turbine which drives a downstream compressor which then supplies the increased pressure for the pneumatic elements. In this case, a pressure reservoir is used as the energy store.

The means for controlling the element on which wind acts are also accommodated in the container which is provided in the vicinity of the element on which wind acts, and these means produce output signals for actuation of the drive elements (actuators). In this case, in particular, means are provided in order to determine a control signal for the drive element from a signal for the course of the vessel, the wind direction and/or the wind speed.

It is advantageous for the control to be based on the direction and the speed of the apparent wind at the element on which wind acts, since its alignment is determined in this way.

The element on which wind acts is preferably controlled by an autopilot apparatus, with a sensor element being provided which is followed by at least one converter element, which is preferably in the form of an accelerometer and at least indirectly emits a control signal to the drive element. A further sensor element emits an output signal with respect to its position and alignment in three dimensions which, in particular, is related to the position of the vessel.

The actual position of the element on which wind acts in relation to the vessel can advantageously also be determined using altimeters and/or earth's magnetic field sensors on the element on which wind acts and the vessel, and/or with the aid of the alignment and the length of the hawser. This makes it possible to ensure that the data is still available even in the event of a system failure.

If a different sensor element is provided, which indicates imminent flow separation or flow separation that has already occurred, or is in the form of an element provided in the area of that surface of the element on which wind acts around which the flow passes and which emits an output signal when the airflow is attached to it, the flight control can be designed such that this prevents the element on which wind acts from dropping in the event of stalling.

It has also been found to be advantageous for means to be provided in order to produce a control signal for three-dimensional alignment of the element on which wind acts or for the maneuver figures externally by means of an on-board unit which is connected to the watercraft. Furthermore, signal transmission means are advantageously provided in order to transmit the third control signal from the on-board unit to the autopilot apparatus, in which case this control signal is preferably a differential-GPS or some other navigation signal, which includes information about the position of the element on which wind acts with respect to the watercraft.

If additional storage means and comparator means are provided which allow storage of signals associated with previous times together with signals which appear at later times, in such a manner that successive maneuver states can be compared, it is possible to provide predictive control of the element on which wind acts in the sense that the predictable consequences for vessel operation are taken into account on initiation of a maneuver.

In one other advantageous embodiment, the drive element and/or the sensor element are/is provided in the container which also forms the attachment point for the hawser and from which holding lines and control lines originate, to which the element on which wind acts is connected. This container is preferably designed to be streamlined and may also have a wind turbine for energy production for aerodynamic control of the element on which wind acts. The streamlined shape may in this case be in the form of a droplet or a wing profile, which can be oriented in the direction of the hawser, or at right angles to it.

The described invention is particularly suitable for seagoing vessels or those which travel in high-seas areas.

In one advantageous application for energy generation, a generator is provided which is driven by the flow of the water, in particular via a vessel propeller or a turbine, and supplies the electrical energy that is generated to an energy store, in particular to a hydrogen generator. The hydrogen obtained by electrolytic splitting of the water is stored, and is held in a reservoir.

Further preferred exemplary embodiments are specified in the dependent claims.

Advantageous exemplary embodiments are illustrated in the figures and will be described in the following text. In this case, the element on which wind acts according to the invention is also referred to synonymously, for short, as a "kite". However, the expression "wing" is also correct, because this is an airborne appliance with a wing function. In the figures:

DETAILED DESCRIPTION OF THE PREFERRED EMBODIMENTS

Figures 1, 1A:
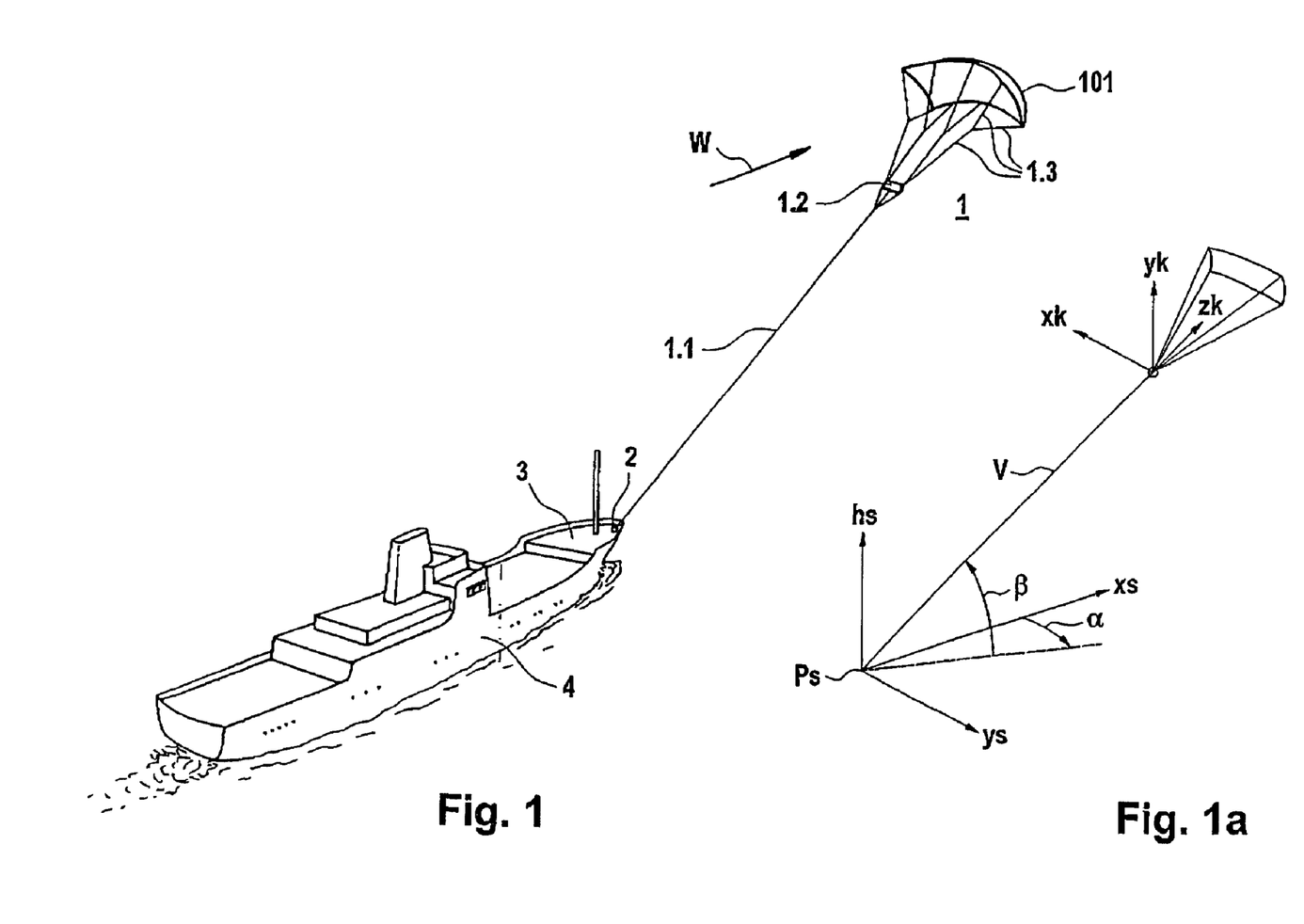
FIG. 1 shows an oblique plan view of a vessel which is being towed by the kite system.
FIG. 1a shows a coordinate system which is used as the reference system for the following description.

FIG. 1 shows an oblique plan view of a vessel which is being towed by the kite system. In this case, an element 1 on which wind acts is connected to a vessel 4 via a hawser 1.1 with an apparatus 2 on which force acts and which is provided in the bow area of the vessel 4. The hawser 1.1 is passed to a central gondola 1.2, from which a number of holding lines 1.3 originate, which are passed to the element 1 on which wind acts and is in the form of a paraglider with a kite profile, giving it the necessary shape. The details relating to this will be explained further below in the description. The apparent wind direction in the area of the element 1 on which wind acts is annotated W. The corresponding wind vector is indicated by its magnitude and direction. If required, its rate of change is also indicated by a variable B, which denotes the gusting, forms the mean time discrepancy between the wind speed and its mean value and can be represented as a scalar, which effectively forms the radius of a sphere around the tip of the wind vector W.

FIG. 1a shows a coordinate system which is used as the reference system in the following description. In this case, $x_s$ indicates the direction of travel of the vessel, and $y_s$ is the direction at right angles to the direction of travel. In this case, the coordinate system should be regarded as being firmly linked to a point $P_s$ on the vessel. This point is preferably the point 2 at which force acts in the bow area. The height $h_s$ in this case corresponds to the direction of the axis z of the conventional coordinate system, and indicates the height above the reference point $P_s$. This reference point is preferably the location at which the GPS antenna of an on-board GPS appliance is fitted, so that the coordinates of a point away from $P_s$, at which another GPS appliance is located, can be produced by subtraction of the coordinates emitted from the two appliances. (If the GPS antenna of the on-board GPS appliance is located at a distance away from the reference point $P_s$, then this could be taken into account by addition of a fixed coordinate difference.)

For simplicity, the following description is based on the assumption of a polar coordinate system, in which the angle α forms the azimuth angle, and the angle β the elevation angle. The direction of the vector V thus in this case points to the gondola 1.2 of the element 1 on which wind acts. This is in fact a "geographical coordinate system", since the gondola 1.2 and the element 1 on which wind acts move essentially on the surface of a sphere. The azimuth angle α and the elevation angle β thus indicate approximately the geographical latitude and longitude of the position of the gondola on the "world sphere" covered by the vector V. The length of the vector V roughly indicates the length of the hawser 1.1, in which case, initially, its catenary drop will be ignored.

The gondola 1.2 of the element on which wind acts is aligned on the basis of its own coordinate system with the directions $x_k$, $y_k$ and $z_k$, where $z_k$ points in the direction of the extension of the vector V. The rotation of the gondola 1.2 of the element 1 on which wind acts about the vertical axis $z_k$ is referred to as the yaw angle. Variation of the yaw angle results in a change in the direction of flight of the element 1 on which wind acts. The yaw angle can be varied, inter alia, by actively driving braking flaps (which are described further below) of the paraglider which forms the element 1 on which wind acts. This results in a direction change, and this process is comparable to the steering of a steerable kite. Rotation about the longitudinal axis $x_k$ represents a rolling movement and is not actively controlled. The catenary drop of the hawser 1.1 resulting from the force of gravity can be determined from the rolling movement and the corresponding discrepancy between the direction from $z_k$ and V, while the rotation about the lateral axis $y_k$ forms the pitch of the element on which wind acts about the lateral axis, and can be caused by gusts and their influence on the hawser 1.1. This reference system forms the basis for understanding of the description of the vessel/kite system which is described further below.

Figure 1B:
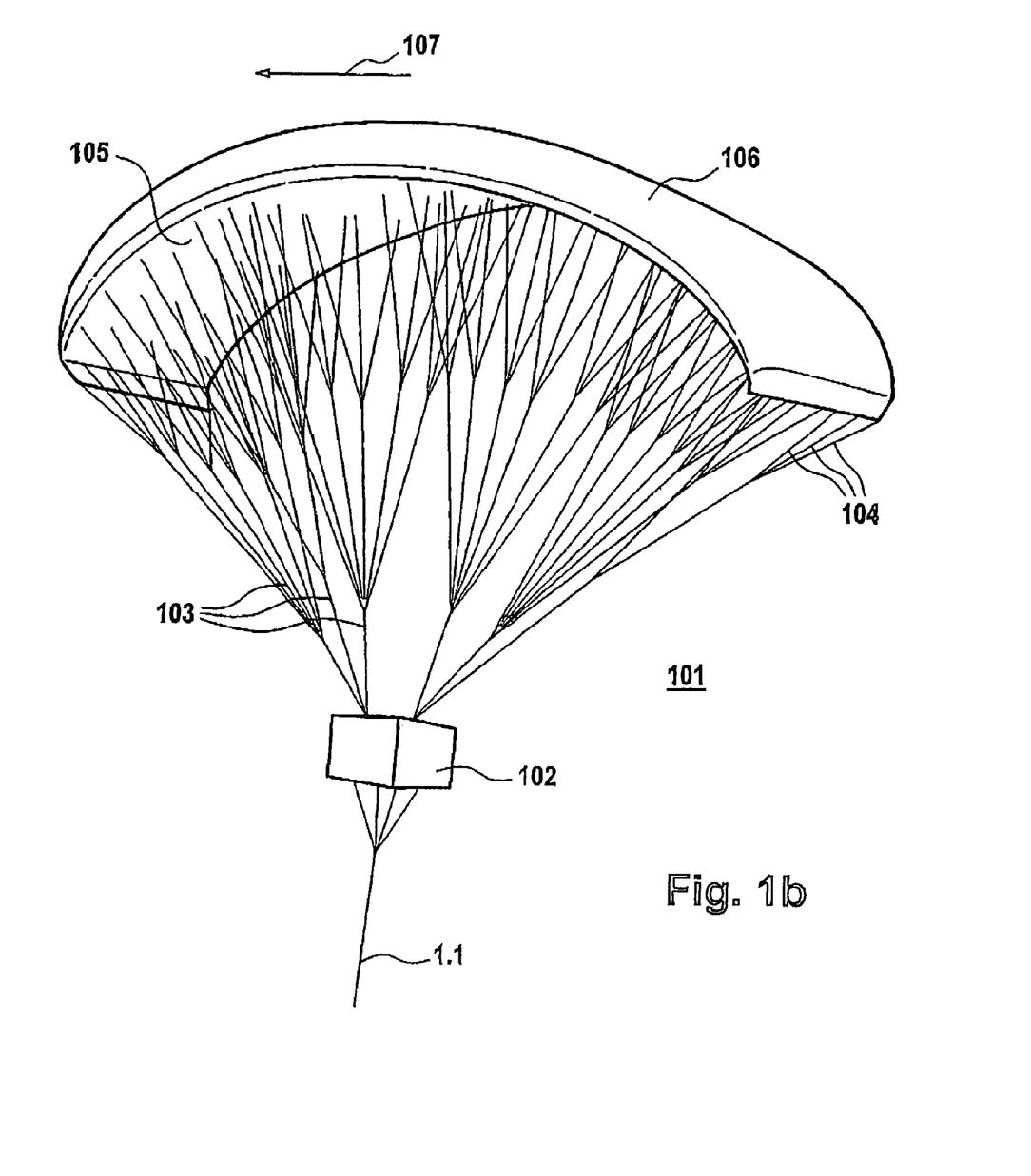
FIG. 1b shows one exemplary embodiment of the element on which wind acts, in the form of a paraglider.

One exemplary embodiment of an element on which wind acts according to the invention is illustrated schematically in FIG. 1b. The element on which wind acts in the illustrated embodiment forms a paraglider 101 with a container 102 for the controller, as will be described in more detail further below. Holding lines 103 originate from the container 102, which is attached to the hawser 1.1, and merge into branches 104 in the form of a line tree, which are connected to a lower textile covering layer 105. An upper textile covering layer 106 forms the closure at the top. The two covering layers are held together by means of internal connecting lines (which cannot be seen in the figure) or corresponding connecting elements, such as textile ribs, with the wing profile which is formed by the two covering layers being stabilized by an internal increase in the air pressure, which is built up via openings in the leading edge of the kite (on the left in the drawing), which are likewise not shown in the drawing, for clarity reasons. The direction of flight is indicated by the arrow 107.

Figure 2:
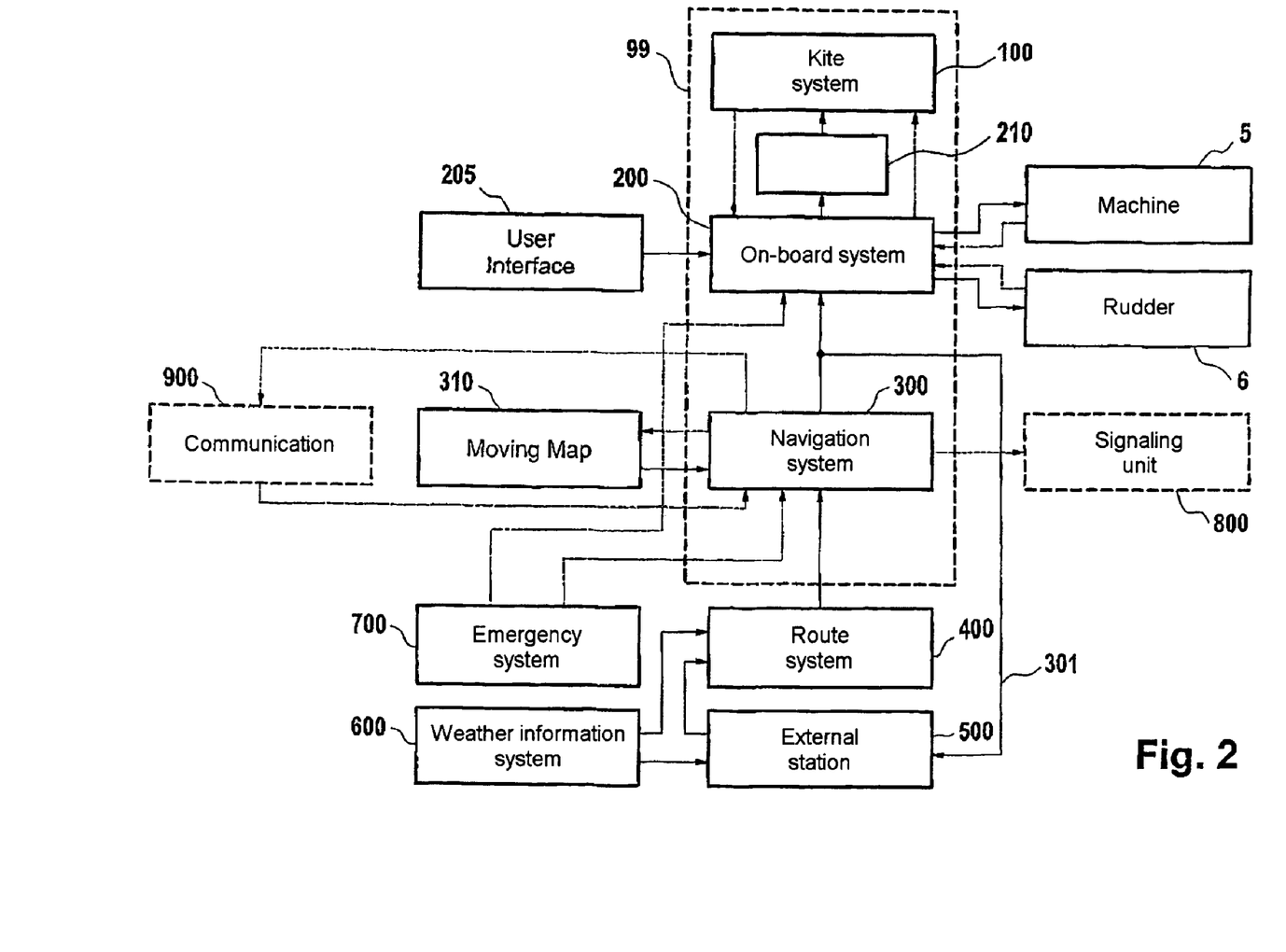
FIG. 2 shows an outline circuit diagram for control of the element on which wind acts, illustrated schematically.

FIG. 2 shows an outline illustration of the wind propulsion system, in the form of a block diagram. The figure also serves for orientation in the following description of the individual system components. Those reference symbols in the 100-series which are used in the overview illustration also form the group designation of the system parts which are each described in more detail further below. (A dashed line 99 in this case surrounds those assemblies which, at the least, must be added to a conventional vessel for it to be additionally equipped with the wind propulsion according to the invention). The system 100 on which wind acts comprises the element on which wind acts as well as the associated control system, if the latter is arranged directly in it. The arrangement may in this case not only be arranged in a gondola which is located at the end of the hawser and from which the holding lines originate, but may also be incorporated directly in the element on which wind acts. The control system essentially comprises an autopilot, which controls the attitude and flight path of the element on which wind acts.

The system 100 on which wind acts is connected via the hawser and a winch 210 (including the hawser) and communication paths, represented by dashed lines, to the on-board system 200 to a user interface 205, which comprises a control system which not only controls the kite position but also emits the necessary control commands to the machine 5 and to the vessel rudder 6. The on-board system is connected to the element on which wind acts via various communication paths which allow not only the kite position to be predetermined in principle by the on-board system but also allow information which is important for the on-board system to be received from the system on which wind acts.

The on-board system 200 is preceded by a navigation system 300, which transmits to the on-board system the route to be maintained by the vessel, taking into account costs, times, speed and wind utilization, possibly as well as the wind direction and wind strength. The wind information may also include a parameter which characterizes how gusty the wind is. Furthermore, this may also include information relating to the sea state and to the vessel movement resulting from it. (The wind and weather data in this case come originally from the weather information system 600, which is described further below). The navigation system is assisted by the navigational information base (moving map) 310.

The course, wind and wave information are used to generate signals which drive the on-board system 200 and results in appropriate adjustment of the kite system 100. The on-board system 200 also produces drive signals for the machine 5 and for the rudder 6.

The navigation system 300 is driven by a route system 400, which determines the course of the vessel by means of the economic basis on which the vessel operation is based. The route system 400 is driven on the basis of data which is predetermined by an external station 500 and is matched to the data from a weather information system 600. The course data currently determined by the navigation system 300 is fed back to the external station 500 via a feedback link 301 (by radio, satellite). The data can also be received by other vessels equipped with the system according to the invention and can be used for local updating of the weather system. This also makes it possible to take into account current, locally dependent course changes for the rest of the external predefinition of the route.

As can be seen, the kite system 100 is positioned as a function of the course data such that an optimum route is preset both on the basis of the weather conditions (actually occurring winds and sea-state conditions) and taking into account the economic constraints which are intended to ensure that the vessel is operated to save as much cost as possible.

An emergency system 700 provides the required control commands in the event of an unpredicted event which necessitates immediate action in the form of an emergency maneuver.

The signaling system and communication system are respectively combined in further blocks 800 and 900, and match the navigation to further vessels. The signaling system includes navigation safety lighting as well as the transmission of its navigation data by radio, which informs other vessels located in the vicinity about the deployed system on which wind acts and about the intended route and the current course. In contrast, the communication system includes all of the systems which relate to the rest of the information interchange process.

The main dataflow paths are represented by solid lines in FIG. 2, while the other message paths are represented by dashed lines.

Figure 3:
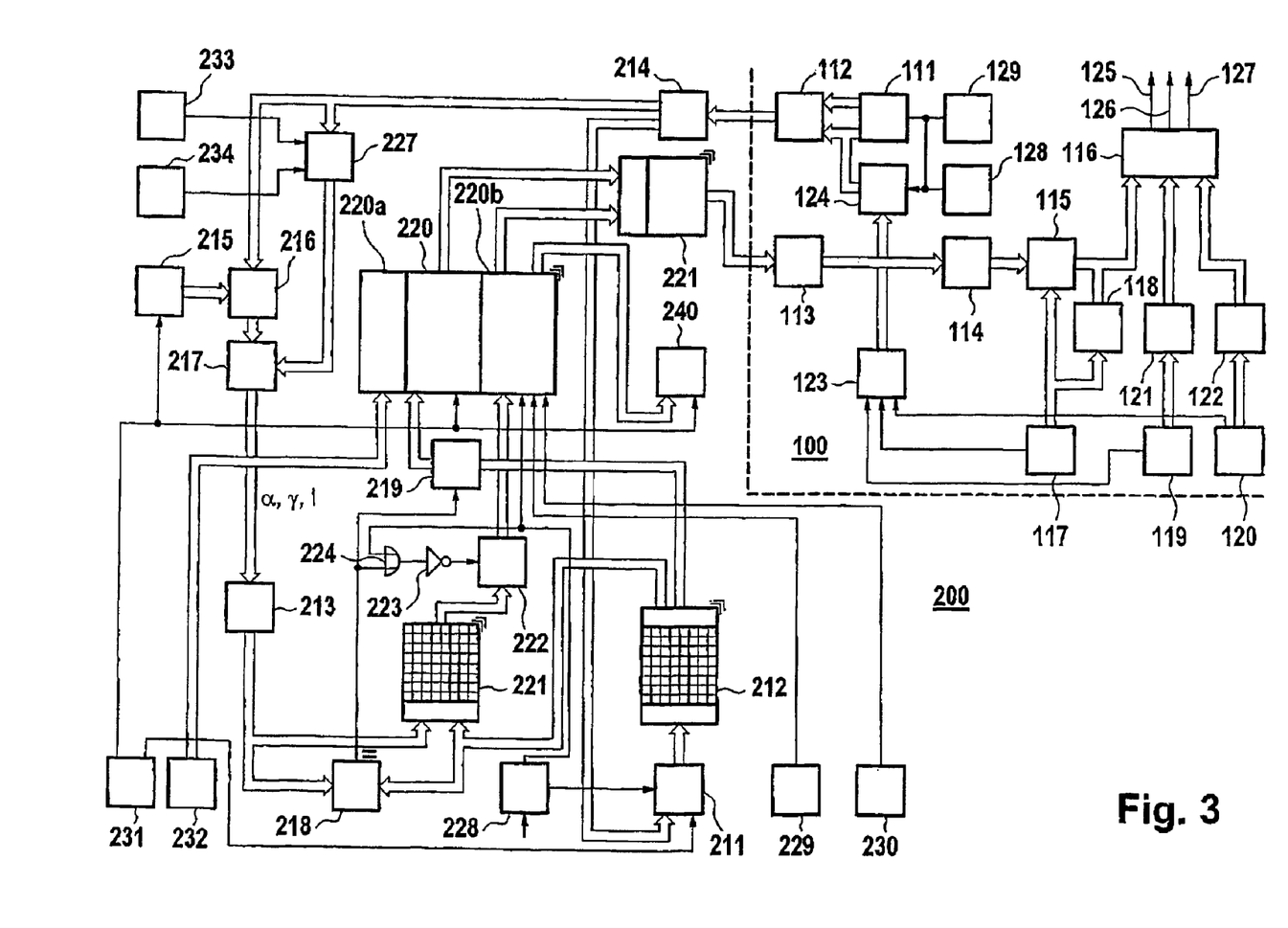
FIG. 3 shows a detailed illustration of the control of the wind propulsion system, in the form of a block diagram.

FIG. 3 illustrates in more detail the block 100, which comprises the system on which wind acts, as well as the block 200 with the on-board system from FIG. 2. The positioning and the control of the kite 101 are described here. The wind-direction and wind-speed information, including the gust characteristic as well as the sea-state information, are passed to a buffer store 211 in which this data is stored for buffering. Since the wind direction and all of the kite settings relate to the apparent wind, the course information is irrelevant during the processing. The adjustment and the maneuvering of the element on which wind acts with respect to the vessel does not require any knowledge of the current course, since all of the maneuvers relate to the vessel and to the influence of the apparent wind acting on the kite. During the deployment of the kite 101, the wind information initially comes from the weather information system 600 in FIG. 2, with regard to the positioning of the kite. As soon as its own wind measurement is operational after launching, however, the apparent wind at the location of the element on which wind acts is itself determined, since this is the governing factor for positioning.

The wind data and sea-state data together form a data record which addresses a memory 212, which forms a look-up table, for the required position and the maneuver type of the element on which wind acts. This look-up table is organized in the same way as a normal addressable memory, with the output data from the buffer store 211 addressing, as address signals, the individual memory locations in which the state data associated with the addressed data for the element on which wind acts are stored. A "look-up table" such as this links the input data and output data with one another in the form of a "read only memory" (ROM) in accordance with a predetermined functional relationship, and can thus be understood as a mathematical association (function). However, the corresponding blocks form only one example of an implementation and can also be replaced by any other desired functional elements or assemblies. By way of example, this may comprise a microprocessor in which the control software is stored in an appropriate memory, or else it may be an electrical circuit in which the functional relationship is defined in the form of an analog computer by the electrical components involved. The representation in the form of a look-up table has been chosen here for the sake of clarity, because a solution with a microprocessor, for example, can be represented less clearly only because the various program steps, which have to be carried out successively, require complex considerations relating to which program parts must be supplied successively to the microprocessor.

In the chosen embodiment, the control signals can be processed in parallel, although those switching elements which result in activation of the illustrated blocks at specific times and the corresponding control processes, are not illustrated. For the sake of simplicity, it is assumed that an incoming control signal which differs from the previous signal state which initiates the processing in the downstream blocks, which retain the relevant state that has been reached, forces new processing to be carried out until a signal change occurs.

The state data thus includes on the one hand the required position of the element on which wind acts, that is to say its direction with respect to the vessel and the length of the hawser to be deployed. Furthermore, if required, it also contains information about whether and when the kite 101 should in fact be maneuvered on the basis of which stored program. While the kite is guided in the steady state, that is to say in a fixed manner, in a number of positions, it is better for vessel operation in some circumstances for the kite to be controlled dynamically, that is to say for predetermined flight figures to be carried out, since this increases its relative speed with respect to the wind and, as a consequence, its towing power as well. The current position of the kite is stored in a further memory 213, as determined by the navigation system of the kite 101.

The actual position of the kite, which is stored in the memory 213, relates to the vessel and is preferably determined by subtraction of two GPS signals. This relates on the one hand to the GPS receiver 124 for the kite 101 within the kite system 100, which is connected to the flying kite 101. The position data determined in the flight position of the kite 101 is transmitted by means of a transmitter 112 to a receiver 214 which is located on board the vessel. A further GPS receiver 215 is likewise provided on board the vessel. Its output signal together with the output signal from the receiver 214 are supplied to a subtraction unit 216, by means of which the differential GPS signal is produced. The difference position data is converted in a block 217, which is connected downstream from the subtraction unit 216, to polar coordinates, which relate to the distance between the winch 2 and the position of the element on which wind acts. These are the angles $\alpha$ and $\beta$ as shown in FIG. 1a as well as the cable length "L". The differential GPS position data obtained in this way is highly accurate if determined at the same time and if the vessel GPS receiver is installed at a location which is affected as little as possible by vessel movements, or if the movements are compensated for.

Furthermore, in this case, it is necessary to take account of the coordinate difference between the positions of the winch and of the GPS receiver in the vessel by subtraction of a fixed value. The position determined by the differential GPS receiver formed in this way is determined at time intervals. If its precision is not adequate, it can be assisted by values which are determined by means of acceleration sensors 117, 119 and 120. The corresponding calculations, which include an integration process, are carried out in the assembly 123. Since only the times which pass before the next GPS position signal are of relevance for the time intervals within which the integration process must be carried out, the integrators do not need to comply with any quality requirements which would guarantee stability over long time periods. (The acceleration sensors are intrinsically used for stabilization of the flight maneuvers, as will be described further below—that is to say they have a dual function). Furthermore, an altimeter 129 (preferably in the form of an air pressure meter) and an earth's magnetic field sensor 128 are provided, with the data items from both of these likewise being supplied to the memory for the navigation signal 124.

A further possible way to determine the actual position of the element on which wind acts with respect to the vessel is to use the data transmitted to the vessel from the altimeter 129 and from the earth's magnetic field sensor 128. This data is transmitted to the vessel in block 227, and is stored. A subtraction process is then carried out in block 227 with the data from the altimeter 233 on the vessel and from the earth's magnetic field sensor 234 on the vessel. If the altimeter 129 is an air pressure meter, weather data from block 600 (isobars) may, however, also be used for determination of the air pressure at the vessel. The position information determined in this way is supplied to the block 217, and if required is matched to the GPS data. This results in the position information from two independent systems being used for mutual support and, if one system fails, the required data is still available.

The required kite position read from the memory 212 is now supplied on the one hand to a comparator 218, which outputs a signal when the actual position of the system 100 on which wind acts, and which position is stored in the memory 213, matches the required position read from the memory 212. In this case, a data record which characterizes the selected maneuver type is read from the maneuver type memory 220 via an enable circuit 219. (In this case, a steady-state flight state may also however be distinguished by the kite not carrying out any maneuvers but remaining in the same flight position. This is the "zero" maneuver type.)

Thus, when this maneuver type memory 220 is activated, a flight program of the sequential type is read, and is transmitted to the autopilot for the system 100 on which wind acts. The output signal from the memory 220 is in this case passed to a transmitter 221, which emits the data and supplies it to a receiver 113 for the system 100 on which wind acts. The signal is passed from the output of the receiver 113 to an autopilot assembly, and from there to a maneuvering control unit 114, which receives signals which identify specific sequential flight maneuvers and converts them to turn values which are supplied to the flight processor 116, which carries out the relevant flight maneuver. In this case, the value to be set is transferred to a turn value comparator 115 to which, on the other hand, the input signal of the yaw value meter 117 is supplied. The flight processor 116 now produces turning flight in the predetermined sequence and for the predetermined duration at its relevant output 125 via an appropriate drive element on the kite 101 by asymmetric braking of the kite 101 or appropriate aerodynamic deformation. The other aerodynamic effects, which are driven by the two other outputs of the flight processor 116, are adjustment of the wing incidence angle and the reefing process, as will be described further below.

The winch 240 is also driven from the positioning memory 220*b* in order to feed out to a specific required cable length.

In order to prevent oscillation about the vertical axis, a signal which has been filtered by means of a high-pass filter is additionally supplied to the flight processor 116, superimposed on the control signal but with an offset phase angle, thus preventing the start of oscillations. While yaw movements can be controlled via the output 125, the incidence angle of the wing is set via the output 126. As is known, the lift/drag ratio can be optimized by the magnitude of the incidence angle of a wing. The reefing of the kite 101 can be initiated via a further output 127. Reefing changes the lift and drag, and may be necessary for individual flight maneuvers.

Since the kite is guided firmly on the hawser, it is automatically stabilized by the tension effect of the cable at its center of lift, with regard to its rolling and pitching movements. However, in order also to preclude oscillations in this case, an attitude signal is in each case transmitted in a corresponding manner from a roll sensor 119 and a pitch sensor 120 via corresponding inverting high-pass filters 121 and 122 to the flight processor, thus avoiding and compensating for sudden attitude changes of the element 101 on which wind acts.

Thus, when the kite is in its predetermined position (an output signal which identifies this state appears at the output of the comparator 218), then the selected maneuver type is read, which causes the kite to carry out a predetermined cyclic flight program. If this maneuver type is transmitted, the control is carried out automatically by the autopilot for the element on which wind acts, and the unit 200 no longer need react provided that the kite does not leave its required position as a result of unpredicted events.

If the required position of the element 101 on which wind acts does not match its predetermined position, possibly because the preset position which has been read from the memory 212 has changed—as is also the case when the kite is deployed—or possibly because the kite has left its position during the course of the maneuvering, then the output signal at the output of the comparator 218 disappears, and the maneuver type, activated via the switching element 219, of the memory 220 ends. The signal "zero" appears at the output of the memory for the maneuver type 220 (left-hand part), and this is interpreted by the autopilot of the system 100 on which wind acts as meaning that the most recently stored maneuver is no longer being carried out. Instead of this, the actual position of the kite, which has been read from the memory 213 and has been determined by GPS, is compared with the required position from the memory 212 by means of a position correction unit 221, and a maneuver is determined which guides the kite to the required position. The correction unit 221 is once again in the form of a look-up table, with the required position and the actual position (once again related to the vessel) being combined to form a common addressing signal, and the identity of a corresponding correction maneuver for the element on which wind acts being read from the actual position A to the required position B. Specifically, care must be taken to ensure that different maneuvers must be chosen depending on the launch and destination point (and possibly also as a function of the wind and wave conditions), in order to maneuver the kite. However, any desired kite maneuvers can be chosen and carried out by means of the stated measures.

If the wind level and sea state play a role in the maneuvers to be carried out, then this data can be "looped-through" from the memory 211 through the look-up table memories 212 and 221, so that this data is still available in the data record for selection of a specific maneuver, and a suitable maneuver can be chosen. However, this does not relate to compensation for individual events, but to general setting guidelines which, for example, may include the kite being flown relatively in a high sea state such that it is possible to compensate as far as possible for the forces acting on the watercraft as a result of the direction of the waves. Thus, for example, if the vessel were to be heeling severely, it would be preferable to use a kite position with a lateral component, while a straight-ahead component would be preferable for a vessel which is pitching severely. For this reason, an output signal from the block 231 for detection of the sea state is passed directly to the block 211, in order to supply information which also affects the choice of the appropriate kite position and maneuvering in the sense described above. A further function of this link is to choose parts of flight maneuvers such that they counteract the accelerations resulting from the sea state. This includes the flying of maneuvers with cyclic flight paths, in which different tension forces act on the hawser at different times, in such a way that these forces occur with a phase shift with respect to the accelerations which are caused by the sea state. This reduces the overall movements of the vessel. This compensation for or reduction in vessel movements by different tension forces, which are caused by the maneuvering, do not interfere with the other methods that are used for sea-state compensation. This is because vessel movements which have been reduced from the start require less effort in order to reduce their effects on the kite flight path. Because of the compensation for the individual vessel movements, reference is made to the description of the block 231 further below.

For position changing, the right-hand part of the memory 220 is addressed via a switching element 222 with the data record that has been read from the correction unit 221, with the switching element 222 being activated by the output signal from the comparator by means of an inverter 223 when the switching element 219 is not activated, that is to say when the required position and actual position are not the same.

Furthermore, the flight stability of the element on which wind acts may also play a role for its position. A multiple-direction ram-air pressure meter 111 provided on the kite on the one hand acts as an anemometer while on the other hand, for that component which is measured in the direction of flight, transmits the state of an incident flow on the kite being excessively low by means of an appropriate signal which, together with the production of a position changing maneuver, also drives the winch controller 240, thus speeding up the change in position of the kite so that the incident flow speed is increased again. (It is evident that the winch can also be driven in the case of "deliberate" position changes resulting from wind data and wave data via the right-hand part of the memory 220b in order, for example, to allow the height of the element on which wind acts to be changed).

For determination of the true wind direction and wind speed, the anemometer has pilot tubes pointing in different directions and having pressure capsules which are evaluated separately. The direction and speed of the wind can be determined with respect to the alignment of the anemometer 111 from the pressure values from the three pressure capsules which are directed at right angles to one another and have the highest pressure values. If the output signal from the magnetic-field sensor 128, which contains a bridge circuit composed of magnetically sensitive resistances and thus makes it possible to determine the direction of the lines of force of the earth's magnetic field, is also taken into account, then the direction of the wind can be related to the northerly direction and can thus be transmitted to the watercraft as the direction of the apparent wind on the element on which wind acts. If required, the correction from magnetic north to geographic north is then also carried out in the watercraft.

An arrow pointing to the block 211 indicates that normal navigation of the kite is rendered inoperative in this case. The rest of the normal maneuver control is also suppressed via an OR gate 224 connected upstream of the inverter 223. (This also applies in a corresponding manner to the blocks 228, 229, 230 and 232, which will be described in the following text and initiate further special functions. However, the associated signal links have been omitted there for reasons of clarity).

The block 228 initiates the "emergency jettison" emergency maneuver by selection and starting of the associated maneuver type via the right-hand part of the maneuver type memory 220b, which contains the respective programs. This maneuver is necessary when the element on which wind acts results in a major risk to the vessel, as a result of unfavorable circumstances or an accident (for example by collision with an obstruction). In this maneuver, the element on which wind acts is completely disconnected from the vessel.

The blocks "deploy" 229 and "stow" 230 initiate the appropriate maneuvers by selection and starting of the relevant maneuver type via the right-hand part of the maneuver type memory 220b, which contains the respective programs.

A block 231 "vessel movements" determines the acceleration component in the direction of the hawser by means of an appropriately aligned accelerometer and, after integration, generates a signal which describes the vessel movements in the direction of the hawser. This signal is supplied to the on-board GPS receiver which produces a position signal (in order to correct the position of the winch controller 240) if the receiver and/or the antenna are/is not themselves/itself mounted in this position. If this GPS position signal were to be evaluated directly together with the GPS position signal received via the receiver 214 from the kite system 100 and were to be used to control the kite 101, then the kite 101 would follow the sea-state movements of the winch in its control process. However, since the kite 101 is intended to fly its maneuver with respect to an imaginary stabilized vessel position, the integrated signal from the accelerometer is additionally supplied, in block 231, to the GPS receiver 215 in order to be subtracted (as a disturbance) from the signal which is supplied to the block 216 for processing, so that the position signal of a "stabilized platform" is processed there. This results in the kite 101 flying maneuvers which are free of sea-state disturbances. Specifically, it can be seen that the sea-state components acting in the hawser direction have the main effect on the flying object while in contrast components in the lateral direction with respect to this contribute only to a change in the angles $\alpha$ and $\beta$ of the flight vector which tends to zero when the hawser is long, and can thus be ignored.

In order to avoid the occurrence of a situation all the time in the described exemplary embodiment in which a flight maneuver that is being carried out is interrupted, when the sea state is high, by the detection of a discrepancy in the difference block 218, with the need to carry out a controlled "flight" to the correct position (in this case by activation of the winch 240 via the right-hand maneuver block 220b), there is a direct link from the block 231 to the winch controller 240. The winch controller 240 directly receives the command to pay out and to wind in, in response to the sea-state movement in the hawser direction being found by the block 231, so that the vessel movements are compensated for directly for the kite. A position correction by means of an appropriate maneuver is initiated only when this compensation is no longer sufficient, for whatever reason.

In order to allow maneuvers to be initiated manually as well, the appropriate input commands can be made by means of a user input 232, which is part of the user interface 205 in FIG. 2. Appropriate commands can be used to directly transmit control commands to the autopilot unit and to the winch controller 240 in the left-hand part 220a of the maneuver memory for manual commands, with the rest of the signal output from this memory being suppressed. These comprise the functions "left", "right", "straight", "reef", "unreef", "incidence (+)", "incidence (−)", "winch (+)" and "winch (−)". The intensities of all of the commands can be modulated.

In the case of one variant which is included in the described embodiment, "predictive maneuvering" is carried out by inputting fictional wind and course data into the system in order to calculate the current position of the element on which wind acts, with the configuration that is then selected being displayed for information. The vessel control system can then estimate the predictable behavior of the system from this, and can appropriately adjust the navigation. This multiple processing of the data in the form of possible prediction is represented in FIG. 3 by multiple angles at the corners of various memory elements, with the aim of indicating that the contents of these memories are evaluated more than once, independently of the current process control. Thus, in this case, additional memory means and comparative means are provided, which allow storage of signals associated with previous times with signals which occur at later times in such a manner that successive maneuver states can be compared on the basis of different—including fictional—input data.

Figure 4:
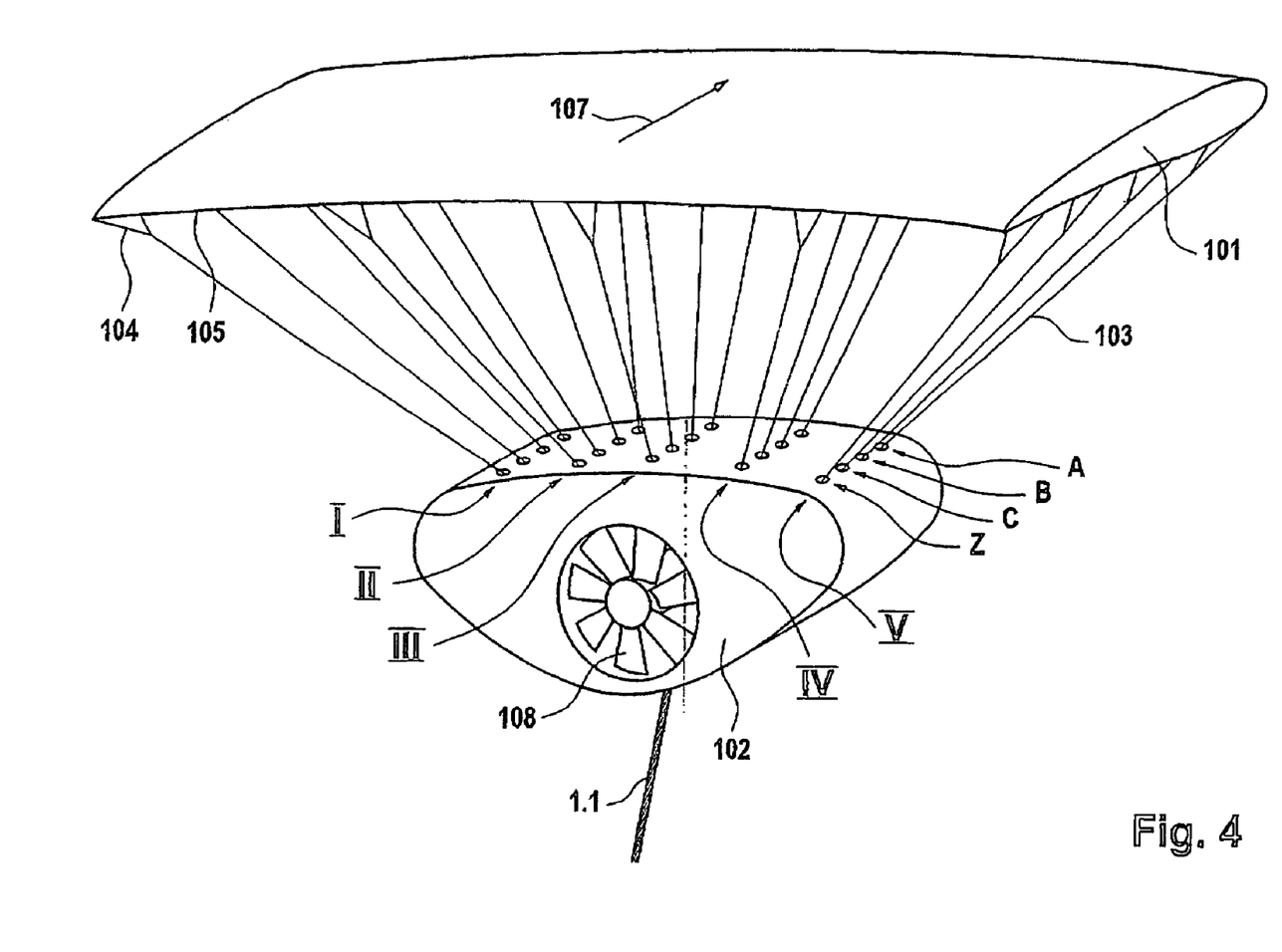
FIG. 4 shows a control device for the element on which wind acts, illustrated in perspective form.
Figure 4A:
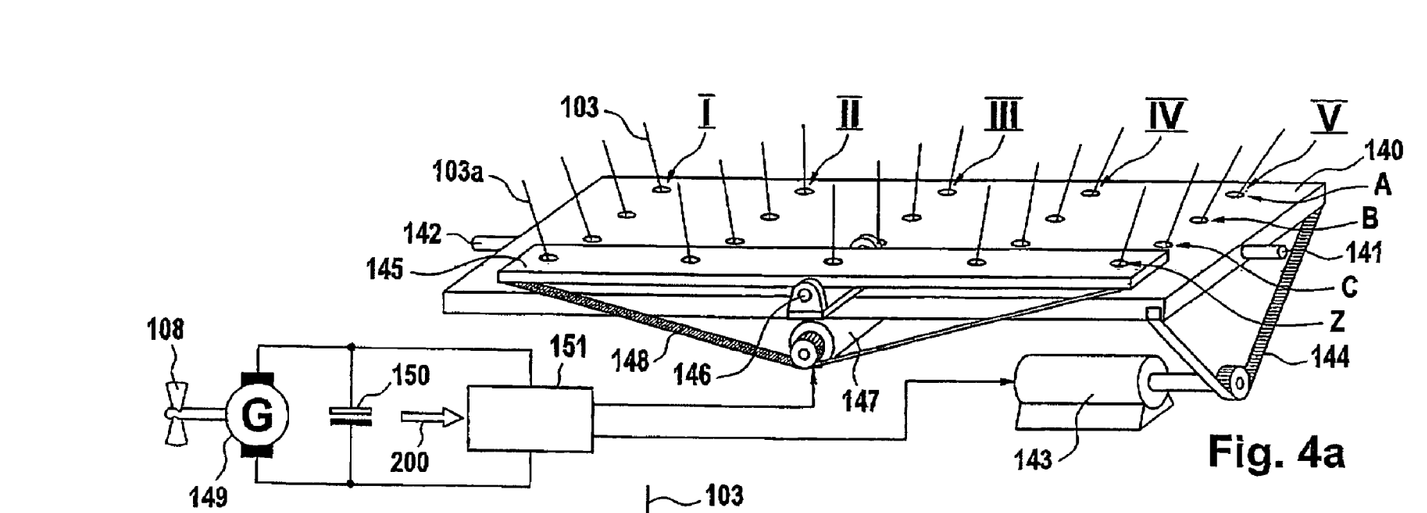
FIG. 4a shows a schematic illustration of the mechanical principle of a first exemplary embodiment of the control device as shown in FIG. 4.
Figure 4B:
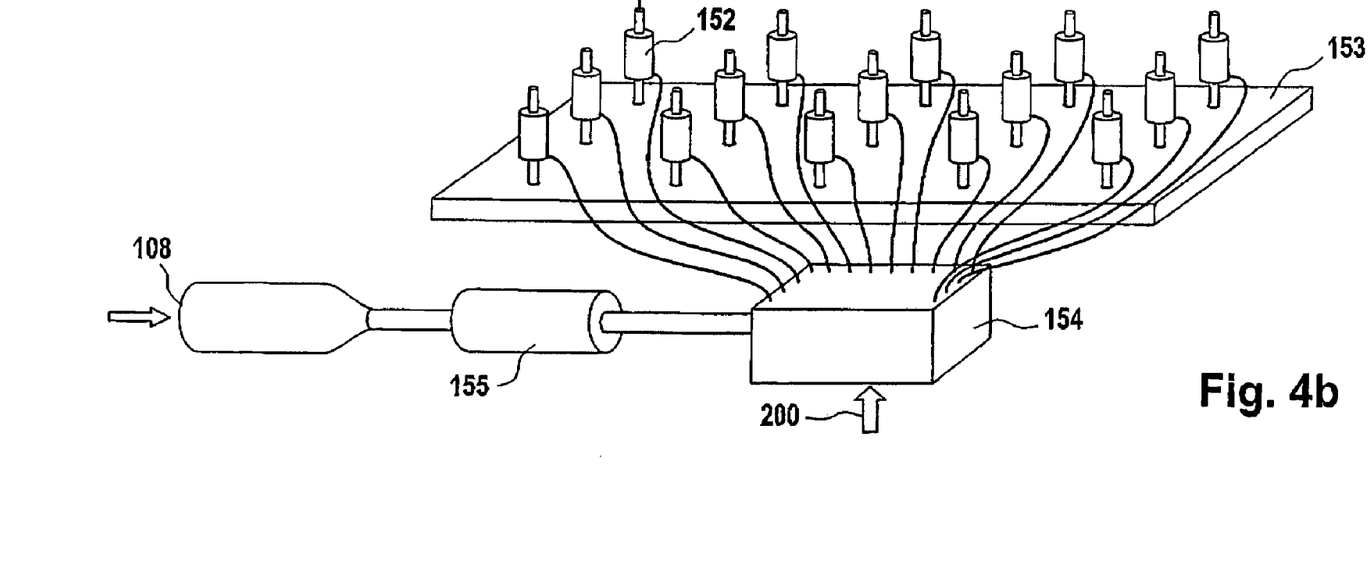
FIG. 4b shows a schematic illustration of the mechanical principle of a second exemplary embodiment of the control device as shown in FIG. 4.

The way in which the paraglider which forms the element on which wind acts is controlled is illustrated in more detail in FIGS. 4 to 4b. The element 101 on which wind acts and is illustrated in FIG. 4 is once again connected to the container 102, which is designed in a streamlined shape and is attached to the hawser 1.1, for control purposes. The control lines 103 which originate from the container 102 are arranged in the form of a point matrix, with the columns of the matrix being provided with roman numerals I to V, and extending in the direction of flight. The rows are annotated with upper-case letters, with their sequence being aligned in the opposite direction to the direction of flight. One important factor in this case is that the individual lines which merge into branches 104 in the form of a line tree and are connected to a lower textile carrying layer 105 can be shortened or lengthened individually or in groups in order to achieve the aerodynamic matching of the paraglider. The direction of flight is once again denoted by the arrow 107.

The control lines 103, which are arranged in the form of a matrix, end in the container 102, which is designed to be streamlined and is rounded in its forward direction. A wind turbine 108 is driven by the airflow passing through it and is connected to a generator, which converts wind energy to the energy required to operate the drive elements, which will be described further below, for adjustment of the control lines 103. Different types of energy can be used for this purpose, but preferably electrical energy and pneumatic energy. If pneumatic energy is used, the generator is in the form of a compressor and provides the auxiliary energy directly, as will be described with reference to the following figures.

FIG. 4a shows a first exemplary embodiment of a control mechanism, illustrated schematically. As can be seen here, the control lines 103 also form a matrix-like arrangement in this case, which makes it easier to influence a kite in the form of a paraglider. All of the control lines 103 and 103a are each driven in a combined form on a first rocker 140 and a common operating element. The rocker is mounted in axle stubs 141 and 142 such that it can pivot, although the rotary bearing has been omitted from the drawing, for clarity reasons. The arrangement of the lines once again forms rows A to C and Z and columns I to V. A first electrical drive motor 143 drives the rocker 140 via a toothed belt 144, so that the line rows A to C and Z are each moved by identical amounts. Since the line rows A and C are located on the outside on the rocker, they are jointly (but in opposite senses) provided with the greatest linear movement, while the line rows B and C (correspondingly in opposite senses) are each moved through only half the linear distance. The operation as described here corresponds to setting the incidence of the kite as appropriate for the required aerodynamic circumstances. Operation of the rocker 140 results in adjustment of the attitude of the wing which is formed by the element 101 on which wind acts.

A further rocker 145 is mounted in the lateral direction on the rocker 140, and is mounted such that it can rotate about a shaft 146. This is driven via a toothed belt 148, by means of a second electrical drive motor 147. In this case, the lines 103a on the rocker 145 are likewise jointly driven—in addition to the drive movement caused by the rocker 140. The situation now is that the lines which are located on the outside and belong to the rows I and V are moved for the greatest linear distance (in opposite senses), while the linear movements of the lines II and IV, which are located further inwards, are correspondingly less. To this extent, the line III remains completely at rest. The lines in the column Z, which are driven by the rocker 145, act on the trailing edge of the kite and control the direction of flight (yaw) in a corresponding manner to the aileron movement of an aircraft. This thus results overall in twisting in the area of the trailing edge of the kite, and this influences the movement about the vertical axis.

As can be seen, the lines can also be driven in groups in a different manner in order to deform the kite—depending on the desired profile. By way of example, the rockers may be additionally divided and may be provided with further drive elements, so that multiple subdivision of the drive movements is possible. For example, one-sided operation of the Z lines (brakes) or additional asymmetric deformation of the element on which wind acts is possible by, for example, directly driving the lines in the groups I and V, while the lines in the groups II and IV are moved to a lesser extent by being stepped down (pulley block—not illustrated) by means of guide rollers and duplicated line routing. A pulley block can also be used as a step-up means when the aim is to lengthen the line distance. The drive motors 143 and 147 are preferably in the form of stepping motors.

The energy for the motors 143 and 147 is produced by means of the wind turbine 108, which drives an electrical DC-voltage generator 149, which itself charges an energy store 150 (rechargeable battery or high-capacitance capacitor, in particular a "Goldcap"). The energy is supplied to a control unit 151, which supplies the necessary drive voltages (pulses) to the electric motors 143 and 147. The control unit 151 itself receives its control commands from the already described autopilot unit 114.

As can be seen, the illustrated type of joint drive reduces the number of drive elements. The jointly driven operating element may in this case also comprise a different type of element, which is mounted such that it can rotate, a rocker, a lever or the like, which is moved jointly via one drive motor. The individual control lines are attached via the branches to differently chosen attachment points on the lower web of the paraglider. This then results in the movement of the operating element being converted to the desired geometry change of the entire element on which wind acts, or of parts of it, in order to produce the variation of the aerodynamic shape as required for the desired propulsion or maneuvering movement. In this case, by way of example, appropriate arrangement of the control lines also makes it possible to vary the thickness of the kite profile of a double-skinned paraglider. In this case, every alternate pulling line would pass through the lower covering surface without being connected to it, in order to be attached to the upper covering surface. These can be shortened, while the other lines are firmly connected to the lower covering surface, without their length being changed.

In another embodiment of the means of controlling the element on which wind acts, as illustrated in FIG. 4b, the drive elements comprise linear actuators, with each linear actuator being formed by a pneumatic element 152, which expands in the lateral direction when subjected to increased pressure, so that its length is shortened. Elements such as these are known as "artificial muscles" and are driven pneumatically. Each pneumatic element 152 is connected to one line 103 (illustrated by way of example in FIG. 4*b*). In the embodiment illustrated in this figure, the base surface 153 is fixed and the individual actuators 152 are each driven with the required amount of compressed air via a metering unit 154, in order to produce line deflections corresponding to the exemplary embodiment shown in FIG. 4*a*.

The actuators are filled with air as "artificial muscles" and in the process contract by virtue of their nature. This can be achieved, for example, by surrounding the flexible sheath with a type of wire-mesh fabric which, when subjected to strain in one direction, contracts in the mutually perpendicular axis direction. The metering device 154 is likewise driven by the output signals from the autopilot, which will be described later. The required compressed air energy is obtained in the illustrated exemplary embodiment from the wind turbine 108, which is followed by an air compressor 155. This air compressor 155 may, for example, be in the form of an axial compressor (aircraft turbine) or as a radial compressor (turbocharger).

Figure 4C:
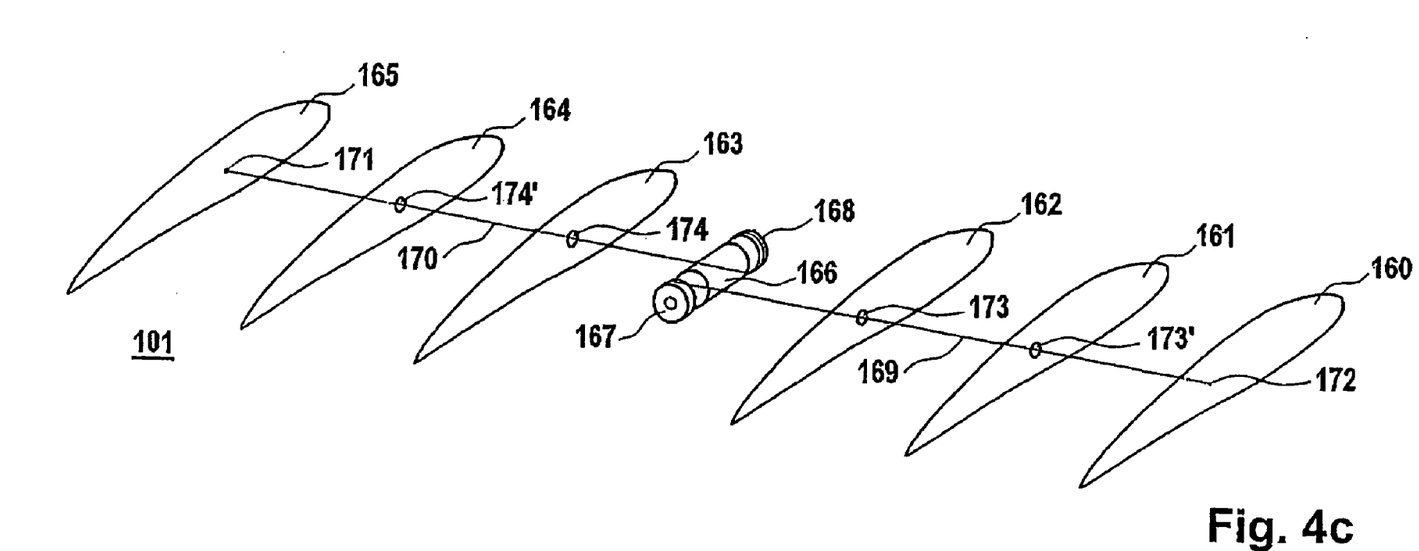
FIG. 4c shows a schematic illustration of the mechanical principle of a first exemplary embodiment of a reefing device for a control device as shown in FIG. 4.
Figure 4D:
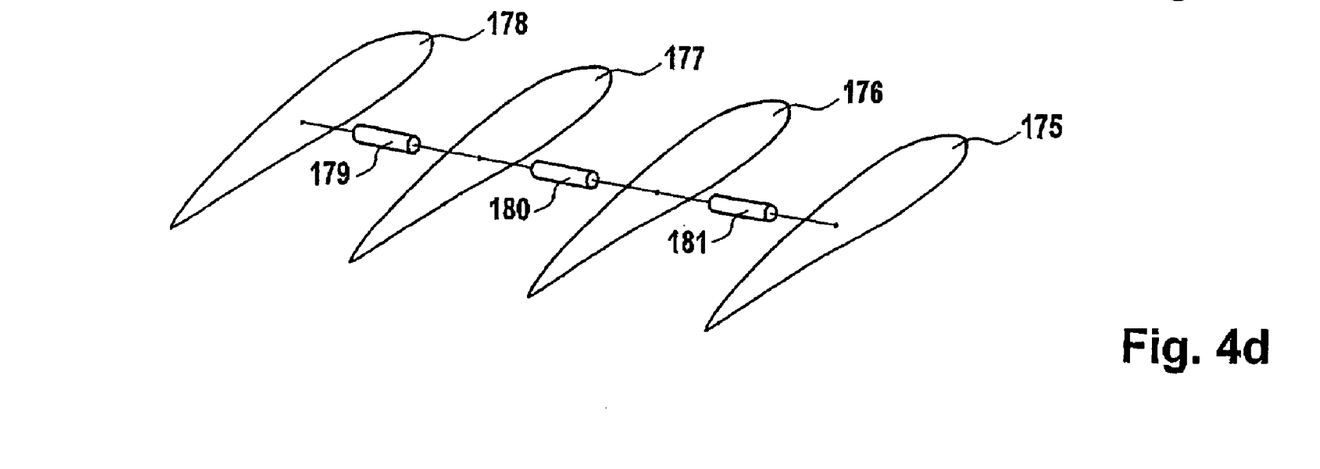
FIG. 4d shows a schematic illustration of the mechanical principle of a second exemplary embodiment of a reefing device for a control device as shown in FIG. 4.

Two exemplary embodiments of reefing devices are illustrated in FIGS. 4*c* and *d*, with FIG. 4*c* showing a schematic illustration of the mechanical principle of one exemplary embodiment of a reefing device with an electrical winch, and FIG. 4*d* showing one exemplary embodiment with pneumatic actuators. In the exemplary embodiment illustrated in FIG. 4*c*, textile webs 160 to 165 are shown, which form the structure, forming the profile, for the element 101 on which wind acts. The covering surfaces have been omitted in this schematic illustration. An electric servo motor 166 is in the form of a stepping motor and is fitted at the ends of its driveshaft with two winding disks 167 and 168. These wind up two pulling lines 169 and 170 in opposite senses, with these pulling lines 169 and 170 being connected at attachment points 171 and 172 to the respective webs 160 and 165. When the motor 166 is activated, it thus shortens the pulling lines and pulls on the webs 160 and 165. The pulling lines 169 and 170 for the other webs 161 to 164 are passed through cutouts 173, 173' and 174, 174' so that these are passed only over the folding covering layers of the wing when these are being reefed. Partial reefing is possible by partially pulling on the lines 169 and 170. Unreefing is carried out by activation of the servo motor 166 in the opposite direction, in which case the element 101 on which wind acts and which is in the form of a paraglider (see FIG. 2) assumes the unreefed state again, by virtue of its curved shape and the pulling force on the lines, without any additional operating force. As is illustrated schematically in FIG. 4*c*), the driveshaft with the two winding disks 167 and 168 need not be arranged between the textile webs 162 and 163, that is to say within the wing profile. It can also advantageously be arranged in the container 102, to which the pulling lines 169 and 170 are then passed. On the other hand, these pulling lines may, however, also pass by the container 102.

In the other exemplary embodiment which is illustrated in FIG. 4*d*, and which is shown in a correspondingly schematic manner, webs 175 to 178 which are like spars and have pneumatic actuators 179 to 181—in the same way as those used in a corresponding manner in the exemplary embodiment illustrated in FIG. 4*b*—are provided in order to reduce the distance between the webs by pulling, and thus to carry out a reefing process. The ends of the actuators are each firmly connected to two adjacent webs. Unreefing can in this case also be carried out actively by operation of the actuators 179 to 181 in the opposite sense.

A further exemplary embodiment (not illustrated) relates to use for obtaining energy, in which a generator is provided which is driven by the flow of the water, in particular via a vessel propeller or turbine, and supplies the electrical power that is generated to an energy store, in particular to a hydrogen generator. These may thus be units which travel exclusively in areas of the world where the wind speeds are high in order to obtain energy, in order to generate hydrogen by electrolytic splitting of water from the electrical energy that is produced, which hydrogen is then also carried in corresponding tanks and is discharged in ports to which the vessel travels, or is transferred to an appropriate transport vessel, at sea.

With respect to details of individual elements of the exemplary embodiment, reference is also made to the patent applications submitted in parallel at the same time by the same applicant.

The invention is not linked just to the described exemplary embodiments. Other configurations which are within the scope of the invention result from combinations of dependent claims, which will be evident to a person skilled in the art on the basis of the above description.

The invention claimed is:

1. A watercraft with wind propulsion, in which a freely flying kite-like element on which wind acts and with a wing profile as an exclusive, auxiliary or emergency propulsion system, is connected to the vessel only via a hawser which may spread out into a number of holding cables, in which the element on which wind acts can be varied via at least one active drive element, which is provided close to or in the element on which wind acts and is operatively connected to it, by variation of its aerodynamic effect for guidance to and holding in a predetermined position with respect to the watercraft and/or for dynamic maneuvering on predetermined flight paths, characterized in that a plurality of control lines are connected to said kite-like element at different locations and form a matrix-like arrangement, with one set of different control lines being driven in a combined form by a driven operating element, and at least another set of different control lines being driven in combined form differently by said driven operating element.

2. The watercraft as claimed in claim 1, characterized in that the active drive element can be supplied with auxiliary energy from a store at the location of the drive element.

3. The watercraft as claimed in claim 1, characterized in that means are provided for variation of the aerodynamic effect of the element on which wind acts, by variation of its alignment, attitude and/or shape.

4. The watercraft as claimed in claim 3, characterized in that the means for operation on both sides and/or for operation in opposite senses, and for variation of the wing profile in the same sense or asymmetrically have a common drive element.

5. The watercraft as claimed in claim 3, characterized in that, in the case of an element on which wind acts which is composed at least partially of textile or other flexible material, the means for variation of the aerodynamic effect have an apparatus for adjustment, preferably for lengthening or shortening, of at least one control line, by means of the drive element, with the control line in particular having at least one bend or feedback area in the form of a pulley block with a step-up or step-down effect.

6. The watercraft as claimed in claim 1, characterized in that means for variation of the aerodynamic effect of the element on which wind acts include means for variation of the shape by symmetrical or asymmetric variation of the wing profile by influencing the alignment of its flow-separation edge, by twisting of the wing profile, by symmetrical and/or by asymmetric variation of the curvature of the wing profile and/or by reefing and/or by variation of the point of attachment of the hawser with respect to the geometry of the wing profile and/or variation of the attitude angle of the wing profile, with the means for variation of the shape in the case of a two-layer wing profile including means for variation of the distance between the two layers.

7. The watercraft as claimed in claim 1, characterized in that means are provided in order to determine a control signal for the drive element at least indirectly from a signal which characterizes the wind direction and/or the wind speed, and possibly to determine a signal which characterizes the sea state, with the signal which characterizes the wind direction and/or the wind speed and possibly the signal which characterizes the sea state being determined by an appropriate sensor, and with the wind direction and/or the wind speed respectively being the wind direction and/or the wind speed of the apparent wind, which are/is preferably determined directly at the element on which wind acts.

8. The watercraft as claimed in claim 7, characterized in that the respective sensors are followed by a processor or logic unit which uses the signals from the respective sensors, associated in a fixed or variable manner, to produce a position, alignment and/or maneuver signal for the element on which wind acts, which signal at least indirectly forms the control signal for the drive element.

9. The watercraft as claimed in claim 7, characterized in that at least one position sensor element is provided directly at the element on which wind acts, and emits an output signal with respect to its position and/or alignment in three dimensions, with this output signal being supplied to a first input of a subtraction apparatus, to whose other input the position, alignment and/or maneuver signal is supplied, and with a direction and/or correction signal, which at least indirectly forms a control signal for the drive element, being available at the output of the subtraction apparatus.

10. The watercraft as claimed in claim 9, characterized in that the position sensor is a differential GPS or some other navigation appliance which produces information about the position and/or alignment of the element on which wind acts.

11. The watercraft as claimed in claim 9, characterized in that the direction and/or correction signal form/forms the input signal to an autopilot apparatus, to whose output the input of the drive element is connected.

12. The watercraft as claimed in claim 9, characterized in that the autopilot apparatus is supplied with the output signal from an acceleration sensor and/or earth's magnetic field sensor as a further correction signal.

13. A watercraft as claimed in claim 7, characterized in that means are provided in order to use a component of the wave movement of the watercraft to reduce the movement of the element on which wind acts in such a manner that either the determination of the position by means of differential GPS is compensated for the vessel movement in the direction of the hawser, so that the GPS signal relates to a "stabilized platform" and/or in such a manner that the winch is driven with an appropriate phase shift.

14. The watercraft as claimed in claim 7, characterized in that the sensors and signal processing means are each provided partially on board the watercraft and partially at the element on which wind acts, and signal transmission means are provided, and in that signal transmission means are provided in order to provide the signal interchange between the two groups of sensors and signal processing means.

15. The watercraft as claimed in claim 7, characterized in that the position and alignment signals relate to the position of the element on which wind acts with respect to the watercraft or to the earth's surface.

16. The watercraft as claimed in claim 7, characterized in that the sensor element is in the form of a sensor for imminent flow separation or for flow separation that has already occurred and comprises an element which is provided in the area of the surface of the element on which wind acts around which the flow passes, with the element emitting an output signal when airflow is present.

17. The watercraft as claimed in claim 1, characterized in that altimeters are provided on the vessel and on the element on which wind acts, in order to determine the position of the element on which wind acts.

18. The watercraft as claimed in claim 1, characterized in that the length and alignment of the hawser are used to determine the position of the element on which wind acts.

19. The watercraft as claimed in claim 1, characterized in that the drive element is provided in a container which is designed to be streamlined and forms the point at which force acts for the hawser, and from which holding and control lines originate, to which the element on which wind acts is connected.

20. The watercraft as claimed in claim 19, characterized in that the container is droplet-shaped.

21. The watercraft as claimed in claim 19, characterized in that the container is in the form of a wing profile and is oriented in the direction of the hawser, or at right angles to it.

22. The watercraft as claimed in claim 1, characterized in that a generator is provided in order to obtain energy, which is driven by the flow of the water outside the watercraft and supplies the electrical energy that is generated to an energy store.

23. The watercraft as claimed in claim 1 wherein individual control lines are driven by means of differently chosen step-down or step-up ratios.

24. The watercraft are claimed in claim 1 further including a second driven operating element and wherein at least some of said control lines are jointly driven by said second driven operating element.

25. A watercraft with wind propulsion, in which a freely flying kite-like element on which wind acts and with a wing profile as an exclusive, auxiliary or emergency propulsion system, is connected to the vessel only via a hawser which may spread out into a number of holding cables, in which the element on which wind acts can be varied via at least one active drive element, which is provided close to or in the element on which wind acts and is operatively connected to it, by variation of its aerodynamic effect for guidance to and holding in a predetermined position with respect to the watercraft and/or for dynamic maneuvering on predetermined flight paths, characterized in that a plurality of control lines are connected to said kite-like element at different locations and form a matrix-like arrangement, said lines being driven being by drive elements, said drive elements comprising linear actuators, with each linear actuator being formed by a pneumatic element whose length is reduced when subject to increased pressure.

* * * * *